(12) United States Patent
Tseng

(10) Patent No.: US 7,142,768 B2
(45) Date of Patent: Nov. 28, 2006

(54) LCD OPTICAL WAVEGUIDE DEVICE

(75) Inventor: Wen-Pao Tseng, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 165 days.

(21) Appl. No.: 10/791,736

(22) Filed: Mar. 4, 2004

(65) Prior Publication Data
US 2005/0196122 A1   Sep. 8, 2005

(51) Int. Cl.
*G02B 6/10* (2006.01)

(52) U.S. Cl. ........................ 385/146; 385/901

(58) Field of Classification Search ................ 385/141, 385/142, 143, 144, 145, 146
See application file for complete search history.

(56) References Cited

U.S. PATENT DOCUMENTS

| 5,143,433 | A | * | 9/1992 | Farrell | .......................... 362/29 |
| 5,479,275 | A | * | 12/1995 | Abileah | .......................... 349/5 |
| 5,986,728 | A | * | 11/1999 | Bernard | ....................... 349/68 |

* cited by examiner

*Primary Examiner*—Jennifer Doan
(74) *Attorney, Agent, or Firm*—Troxell Law Office, PLLC

(57) ABSTRACT

An optical wave-guide device is provided between a light source and a lower diffuser for deflecting and reflecting the light passing through the optical wave-guide device so that the light is consistently diffused through the lower diffuser without creating any blind area among light sources to effectively solve the prior art problem of displaying bright bands and dark bands on the LCD.

11 Claims, 5 Drawing Sheets

LCD OPTICAL WAVEGUIDE DEVICE

BACKGROUND OF THE INVENTION (a) Field of the Invention

The present invention is related to an improved structure of a LCD optical wave-guide device, and more particularly to a backlight module free of dark bands and bright bands.

(b) Description of the Prior Art

As illustrated in FIG. 1 of the accompanying drawings for a sectional view of the structure of a backlight module for an LCD of the prior art, the backlight module is essentially comprised of a reflector mask 10, multiple light sources 20, a diffuser plate 30, a lower diffuser sheet 40, a prism 50, a reflective polarizing sheet or an upper diffuser 60 and a protector sheet 70 arranged in sequence from inside out. Wherein, the light sources 20 may be each a light tube in the shape of a stripe, U-shape or other continuous curve arranged at a proper spacing between the reflector mask 10 and the diffuser plate 30 and the light emitted by each of the light sources 20 provide the display effects by the LCD. Therefore, the diffuser plate 30 functions to diffuse the light passing through it to correct the dark bands and the bright bands created on the LCD due to the absence of light produced at each spacing between two abutted sources 20.

Whereas the diffuser plate 30 functions only to help achieve the even diffusion for light passing through it, it has a limited efficiency in correcting the phenomenon of the bright bands and the dark bands observed on the LCD. An improvement is made for certain backlight modules by extending the distance between the light source 20 and the diffuser plate 30 in the hope of widening the scope of each of those light sources 20 entering into the diffuser plate 30 to achieve the purpose of reducing the dark bands. However, the structural design for such an improvement not only provides limited effects but also results in a backlight module which must be made thicker thereby failing the compact requirements in the current LCD market.

Furthermore, some other backlight modules seek to provide extinction (dispersion) on the surface of the diffuser plate by printing on the diffuser plate with ink containing $SiO_2$ or $TiO_2$ to achieve the purpose of reducing the dark bands. Again, the extinction process not only increases the production cost of the diffuser and the complexity of the manufacturing process, but also relates to a passive solution to reduce the dark bands on LCD since the extinction occurs only after the light lands on the surface of the diffuser.

SUMMARY OF THE INVENTION

The primary purpose of the present invention is to provide an improved structure of an optical wave-guide device to effectively solve the problem of the bright bands and dark bands on the LCD and reduce the spacing between light sources and a lower diffuser sheet to make the backlight module thinner for the meeting compact requirements of the current LCD market by replacing the diffuser plate with an optical wave-guide device. To achieve the purpose, the optical wave-guide device is provided between light sources and a lower diffuser sheet for the light passing through the optical wave-guide device to be properly refracted and reflected to evenly diffuse via the lower diffuser sheet thereby providing an active solution.

DETAILED DESCRIPTION OF THE PREFERRED EMBODIMENTS

Figure 1:
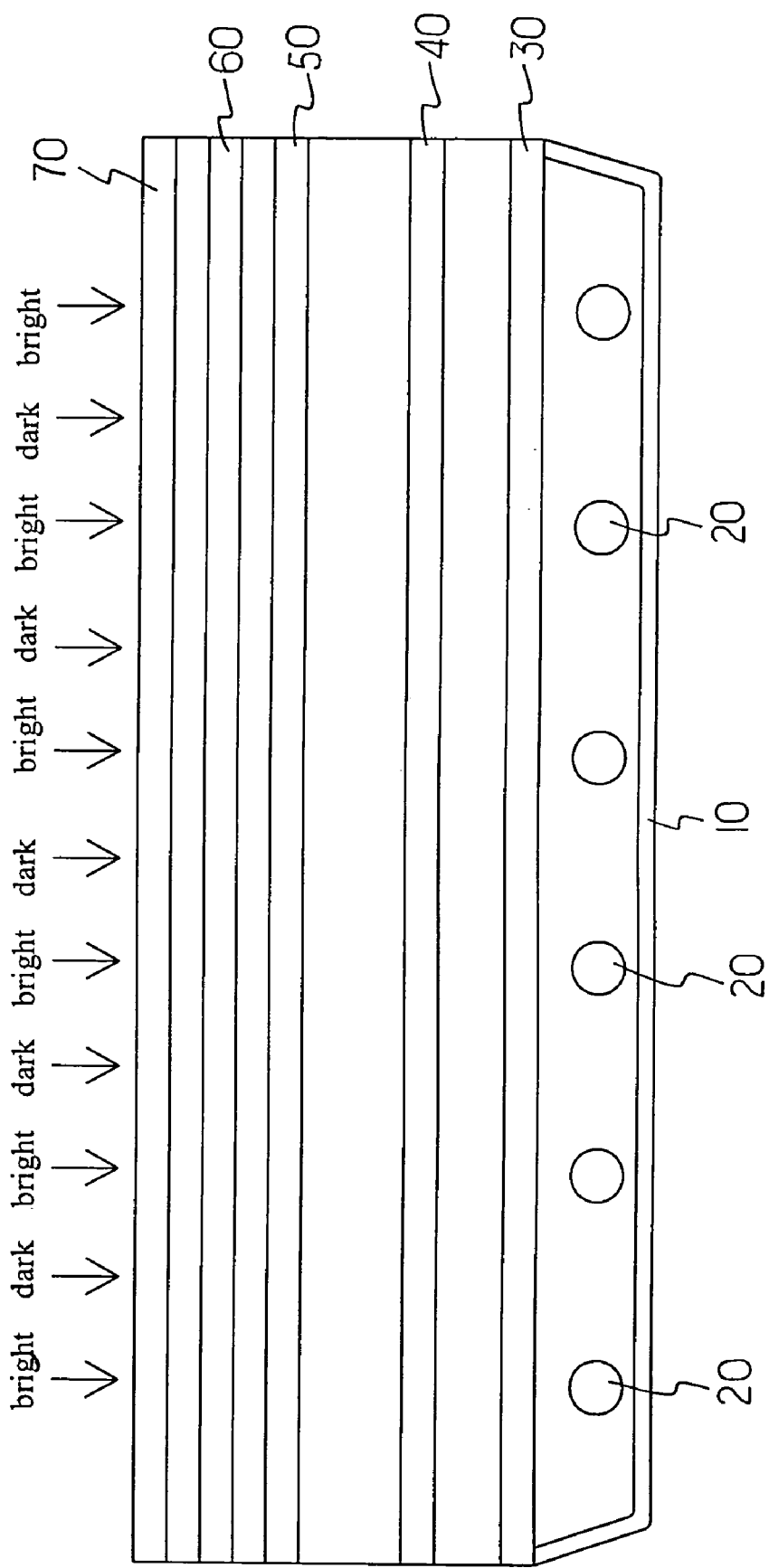
FIG. 1 is a sectional view of the structure of a backlight module of the prior art.
Figure 2:
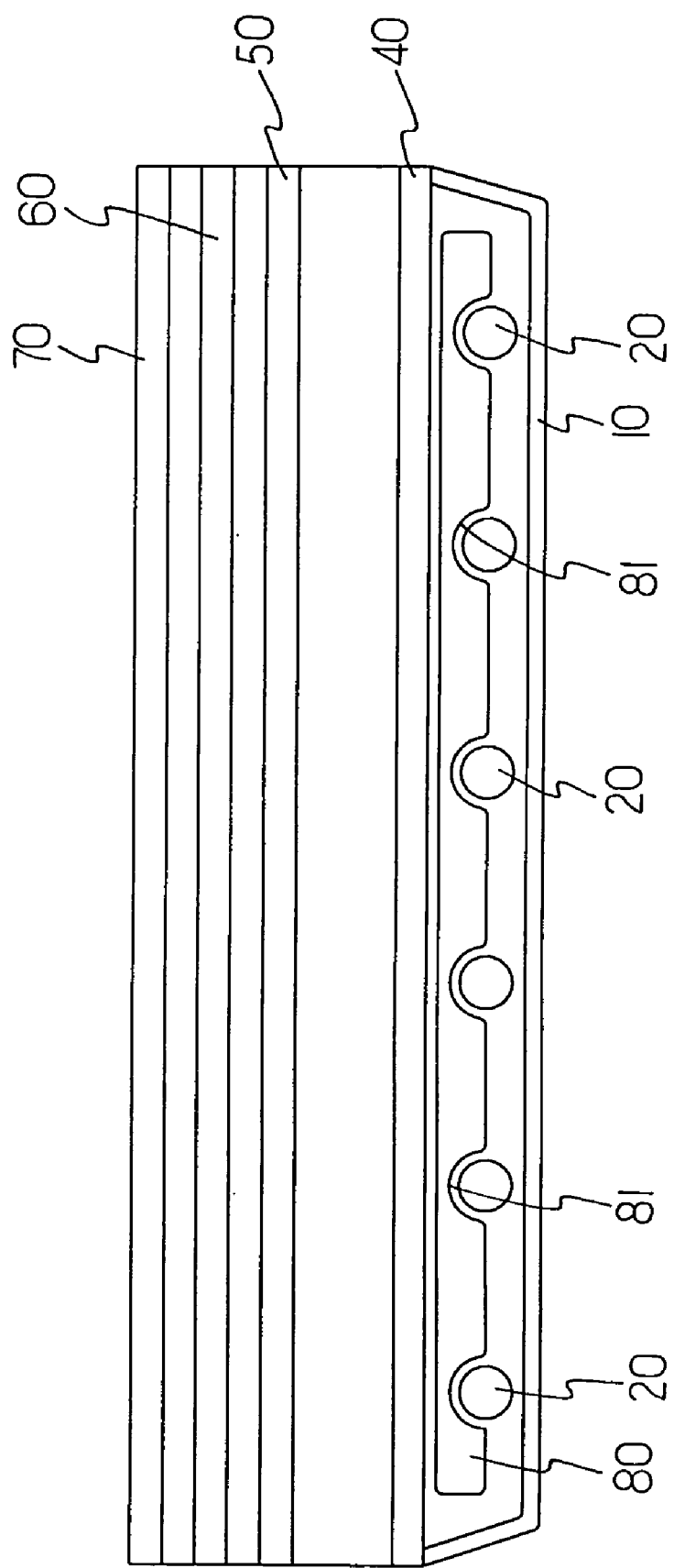
FIG. 2 is a sectional view of a backlight module of a first preferred embodiment of the present invention.

Referring to FIG. 2, a first preferred embodiment of the present invention backlight module having a reflector mask 10, multiple light sources 20, a diffuser plate 30, a lower diffuser sheet 40, a prism 50, a reflective polarizing sheet (or an upper diffuser) 60 and a sheet 70 arranged in sequence from inside out. Wherein, the light sources 20 may be shaped as a light tube in a stripe shape, U-shape or other continuously curved shape. The light sources are preferably arranged at a proper spacing between the reflector mask 10 and the lower diffuser sheet and the light emitted by each of the light sources 20 provide the display effects for the LCD.

At least one optical wave-guide device 80 is separately provided between those light sources 20 and the lower diffuser sheet 50. The optical wave-guide device 80 is made into a plate and provided with multiple recesses 81, each accommodating a respective light source 20. The light emitted from each light source 20 passes through the optical wave-guide device 80 and is refracted and reflected to, thereby, be evenly diffused via the lower diffuser sheet. As a result this preferred embodiment provides an active means to eliminate the bright bands and dark bands which otherwise would be formed between any two abutted light sources 20. Furthermore, replacing the diffuser plate of the prior art with the optical wave-guide device 80 reduces the spacing between the light source 20 and the lower diffuser sheet to further advantageously reduce the thickness of the backlight module.

The optical wave-guide device 80 may be made of plastic materials including but not limited to Polycarbonate (PC), or Polymethyl methacrylate (PMMA), or Polyethylene Terephthalate (PET) in a white or transparent stick structure; or transparent plastic materials, e.g. PC or PMMA added with diffusion agent (such as SiO2 or TiO2) in a white mat stick structure so to produce the optical wave-guide device 80 with various refraction effects for the selection of the proper optical wave-guide device 80 depending on the spacing between the backlight module and the light source 20.

Figure 3:
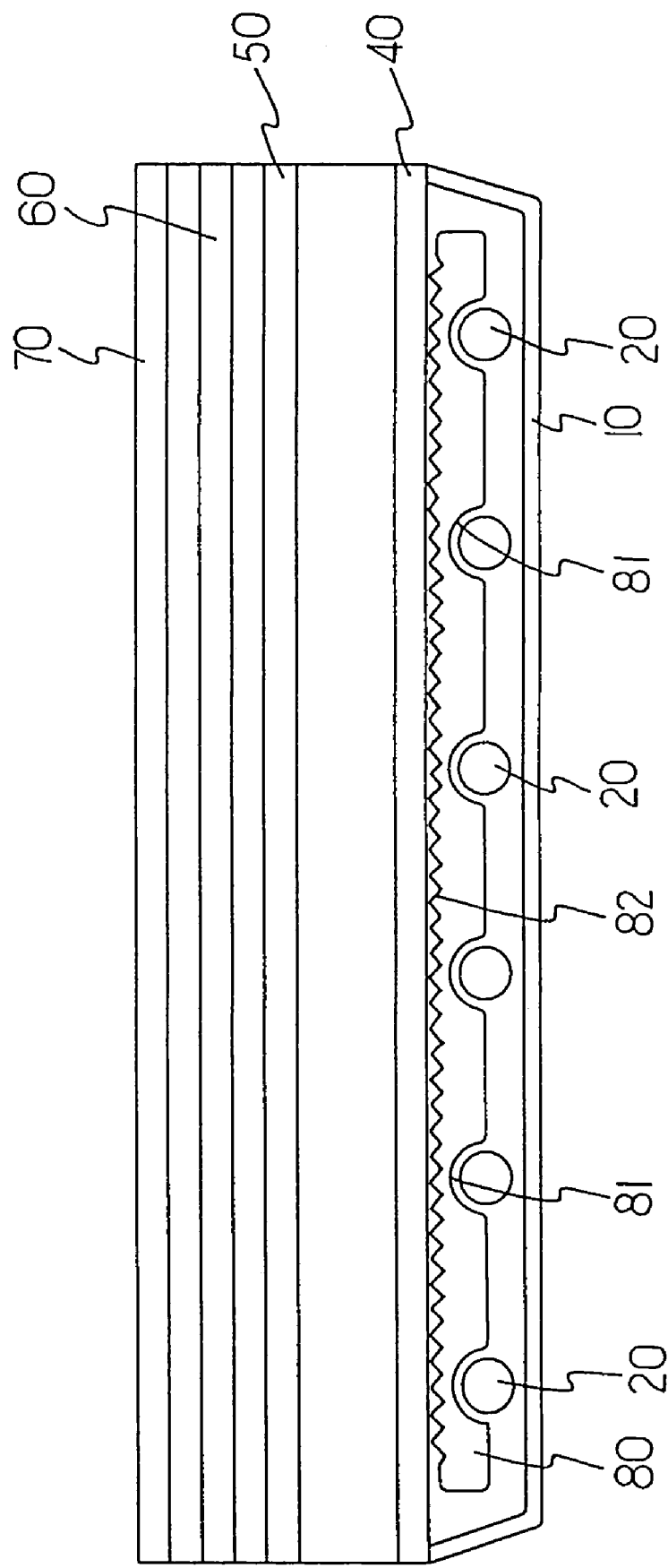
FIG. 3 is a sectional view showing that the surface of the optical wave-guide device of the present invention is embossed on the surface facing a lower diffuser sheet.
Figure 4:
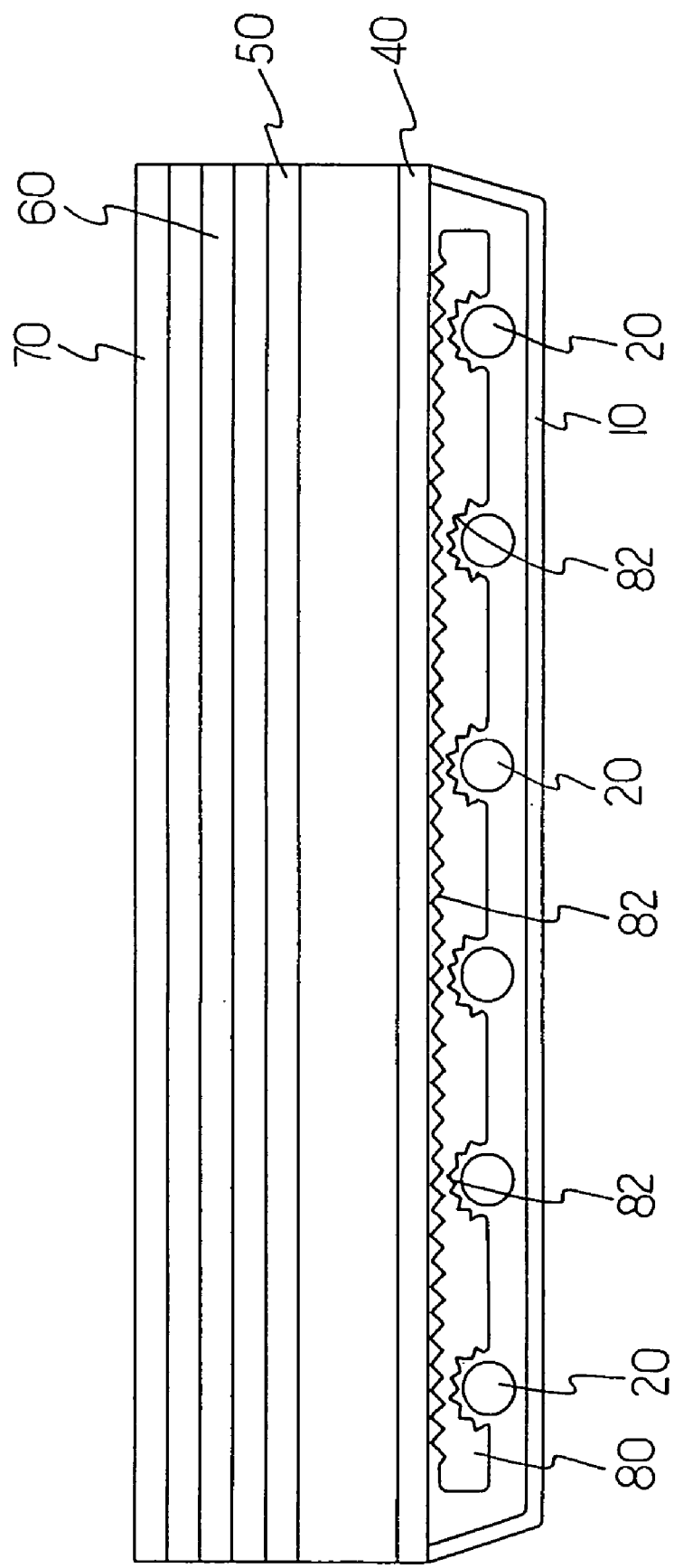
FIG. 4 is a sectional view showing that the surface of the optical wave-guide device of the present invention is embossed on the surface facing multiple light sources.
Figure 5:
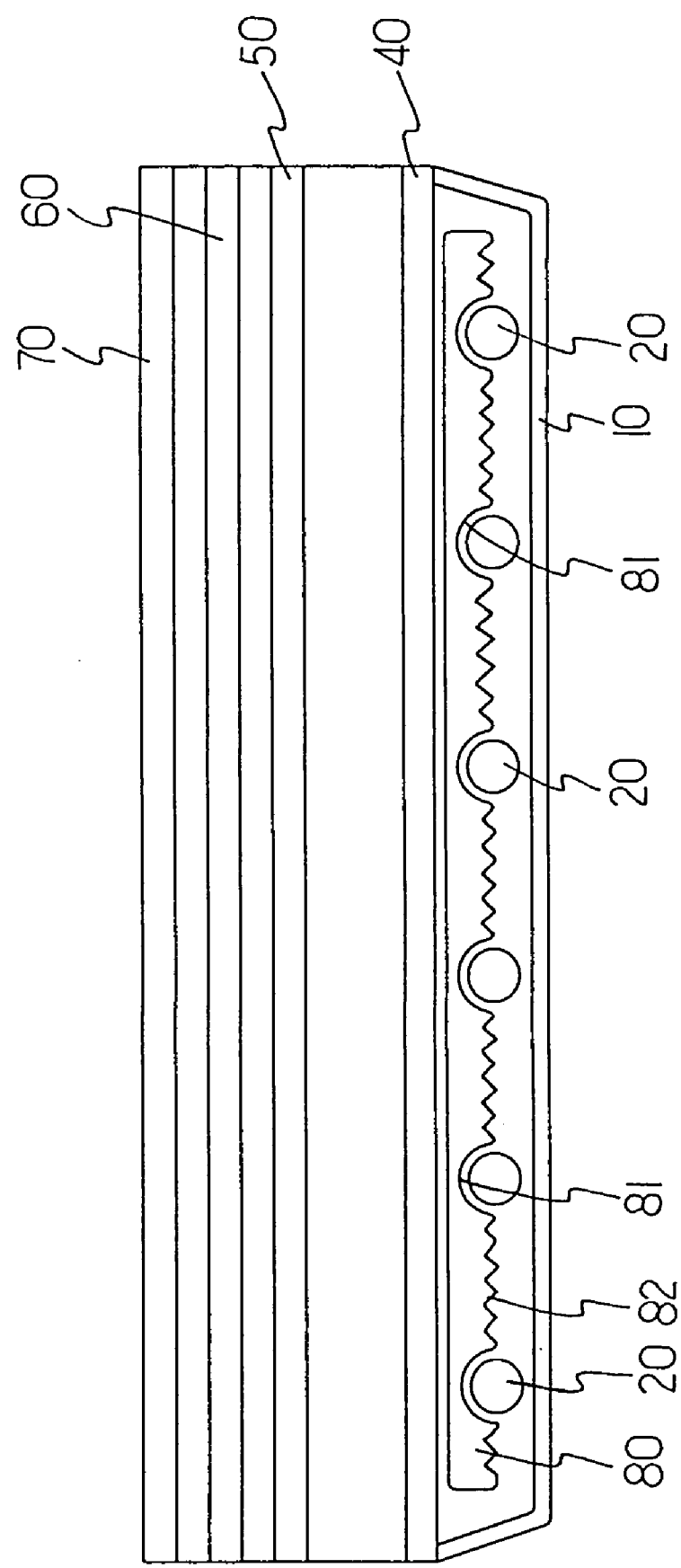
FIG. 5 is a sectional view a sectional view showing that the surface of the optical wave-guide device of the present invention is embossed on the surface facing away the lower diffuser sheet.

Now referring to FIG. 3, at least one surface of the optical wave-guide device 80, is locally or entirely distributed with embossment 82 on the surface facing the lower diffuser sheet 40 in accordance with a second preferred embodiment of the present invention; or on the surface of the recess 81 where the optical wave-guide device 80 is facing the light source 20 as illustrated in FIG. 4 in accordance with a third preferred embodiment; or on the surface of the optical wave-guide device 80 facing away from the lower diffuser sheet 40 as illustrated in FIG. 5 in accordance with a fourth embodiment. The embossment forms at least one straight line or curve (or the combination of both) in the form of V-, U-, or C-shaped cut for the convex of the embossment 82 to create a converging effect so as to evenly distribute the lights from the light source 20 diffusing from the concave portion of each embossment 82, to thereby effectively solve the problem of bright bands and dark bands observed with prior art LCD's. Alternatively, the same effects can be achieved by having at least one surface of the optical wave-guide device 80 locally or entirely matted, or printed with ink, or distributed with concave and convex points in either round, rectangular, diamond or polygonal form.

The preferred embodiments of the present invention provide an improved structure of a backlight module to reduce the spacing between light sources and diffuser plate, and thereby reduce the thickness of the backlight module allowing the production of a more compact LCD. It should be noted that the specification and drawings are provided to describe the preferred embodiments of the present invention and do not in any way limit the present invention. Therefore, any structure, device, and/or characteristics similar or equivalent to that of the present invention shall be deemed as falling within the scope of the purpose and claims made by the present invention.

I claim:

1. An improved structure of a light wave-guide device having a backlight module comprising, in sequence:
   a reflector mask;
   multiple light sources, each light source being spacing from an adjacent light source;
   at least one optical wave-guide device;
   multiple optical films, including a lower diffuser sheet; and
   a protector sheet,
   wherein the optical wave-guide device is formed to have multiple recesses which accommodate and partially surround each light source by substantially conforming to a curved surface of the light source, the optical wave-guide device having an embossed lower surface and an embossed upper surface formed to refract and reflect light from each light source to result in evenly diffused light emanating from the lower diffuser sheet in order to substantially eliminate the dark band formed between adjacent light sources.

2. An improved structure of a light wave-guide device as claimed in claim 1, wherein, the optical wave-guide device is related to a structure in plate shape.

3. An improved structure of a light wave-guide device as claimed in claim 1, wherein, at least one surface of the optical wave-guide device is embossed.

4. An improved structure of a light wave-guide device as claimed in claim 1, wherein, at least one surface of the optical wave-guide device is treated with ink, matted, or printed, or distributed with concave and convex points in either round, rectangular, diamond or polygonal form.

5. An improved structure of a light wave-guide device as claimed in claim 1, wherein, the optical wave-guide device is in the structure of a transparent sheet.

6. An improved structure of a light wave-guide device as claimed in claim 1, wherein, the optical wave-guide device is in the structure of a white sheet.

7. An improved structure of a light wave-guide device as claimed in claim 1, wherein, the optical wave-guide device is in the structure of a mat sheet.

8. An improved structure of a light wave-guide device as claimed in claim 1, wherein, the optical wave-guide device is made of a material selected from the group consisting of Polycarbonate (PC), or Polymethyl methacrylate (PMMA), or Polyethylene Terephthalate (PET) in to a transparent stick structure.

9. An improved structure of a light wave-guide device as claimed in claim 1, wherein, the optical wave-guide device is made of a material selected from the group consisting of Polycarbonate (PC), or Polymethyl methacrylate (PMMA), or Polyethylene Terephthalate (PET) in a white stick structure.

10. An improved structure of a light wave-guide device as claimed in claim 1, wherein, the optical wave-guide device is made of a transparent plastic materials mixed with a diffusion agent to form a matted stick structure.

11. An improved structure of a light wave-guide device of claim 1, wherein at least one surface of the optical wave-guide device is distributed with concave and convex points.

* * * * *